(No Model.) 2 Sheets—Sheet 1.
J. B. THOMAS.
INTERCHANGE COUPLING ATTACHMENT.
No. 568,420. Patented Sept. 29, 1896.
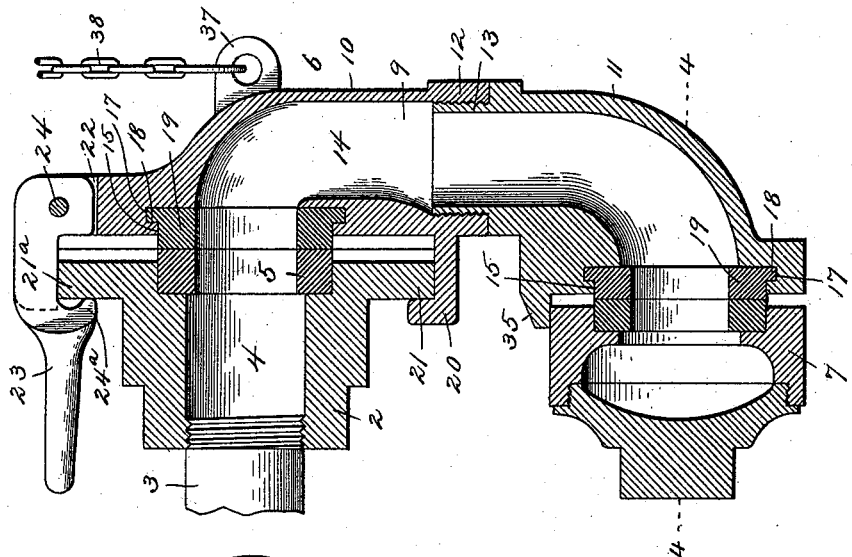
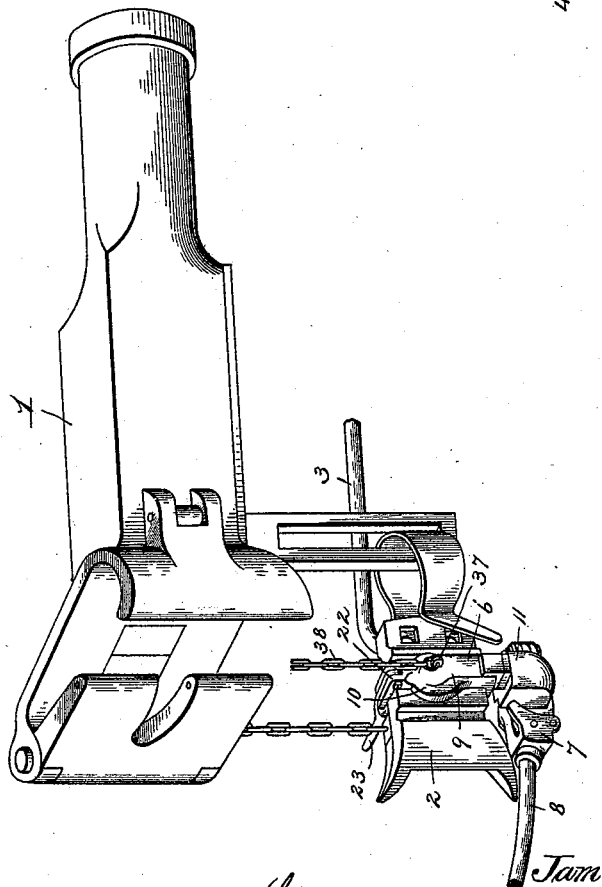
Witnesses
Harry L. Ames.
L. P. Holtzapple.
By his Attorneys,
C. A. Snow & Co.
Inventor
James B. Thomas.
THE NORRIS PETERS CO., PHOTO-LITHO., WASHINGTON, D. C.

(No Model.) 2 Sheets—Sheet 2.
J. B. THOMAS.
INTERCHANGE COUPLING ATTACHMENT.
No. 568,420. Patented Sept. 29, 1896.
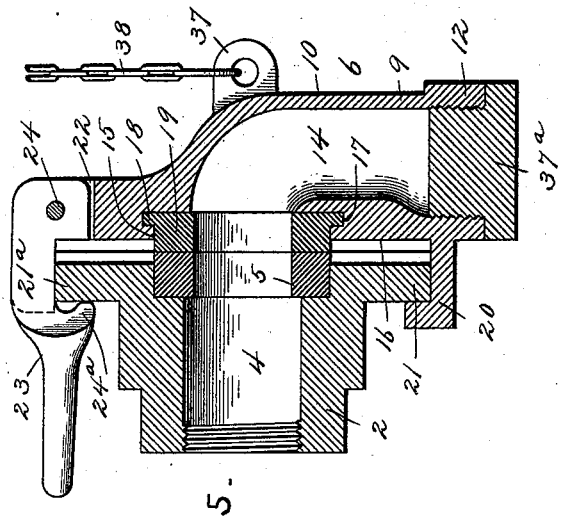
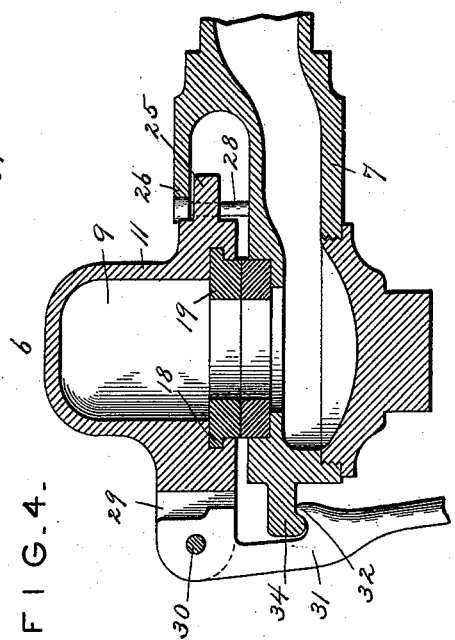
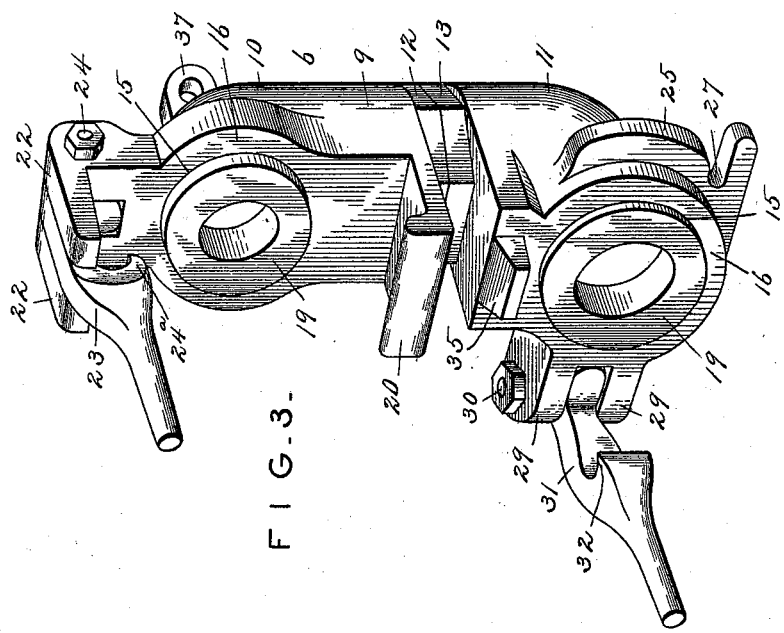
Witnesses
Harry L. Amer.
Inventor
James B. Thomas.
By his Attorneys,
C. A. Snow & Co.

UNITED STATES PATENT OFFICE.

JAMES BRYANT THOMAS, OF ST. LOUIS, MISSOURI.

INTERCHANGE COUPLING ATTACHMENT.

SPECIFICATION forming part of Letters Patent No. 568,420, dated September 29, 1896.

Application filed August 21, 1895. Serial No. 560,036. (No model.)

*To all whom it may concern:*

Be it known that I, JAMES BRYANT THOMAS, a citizen of the United States, residing at St. Louis, in the State of Missouri, have invented a new and useful Interchange Coupling Attachment for Automatic Air-Brake Couplings, of which the following is a specification.

This invention relates to air-brake couplings for railway-cars; and it has for its object to provide a new and useful interchange coupling attachment especially adapted for use in connection with automatic air-brake couplings of the character set forth in Summers's patent, No. 526,119.

The main and primary object of the present invention is to provide a simple and efficient attachment for an automatic air-brake coupling-head whereby a coupling can be effected between an automatic air-brake coupling on one car and the ordinary Westinghouse brake hose-coupling on another car, and therefore by the use of this device the use of air-brakes is greatly facilitated in a train of cars equipped with both the automatic air-brake couplings and the ordinary brake hose-couplings, which two classes of couplings heretofore could not be connected together.

With these and other objects in view, which will readily appear as the nature of the invention is better understood, the same consists in the novel construction, combination, and arrangement of parts hereinafter more fully described, illustrated, and claimed.

In the accompanying drawings, Figure 1 is a perspective view of an automatic air-brake coupling-head and an ordinary Westinghouse brake hose-coupling illustrated as coupled together by an interchange coupling attachment constructed in accordance with my invention. Fig. 2 is a vertical transverse sectional view of the parts illustrated in Fig. 1. Fig. 3 is a perspective view of the interchange coupling attachment disconnected from the air-brake coupling-head of the brake hose-coupling. Fig. 4 is a detail sectional view on the line 4 4 of Fig. 2. Fig. 5 is a detail sectional view similar to Fig. 2, illustrating the attachment used as a dust shield or guard for the automatic air-brake coupling-head when the latter is not in use.

Referring to the accompanying drawings, 1 designates an ordinary car coupling-head from which is suspended the automatic air-brake coupling head or shoe 2, to the outer side of which is connected the usual train-pipe 3. The automatic air-brake coupling-head 2 may or may not be arranged in connection with the car coupling-head 1, but is preferably of that type illustrated and described in Patent No. 526,119. The said automatic air-brake coupling head or shoe 2 is adapted to automatically couple with a companion head or shoe, as set forth in the patent referred to. The train-pipe 3, which is connected to the outer side of the coupling head or shoe 2, is fitted in the outer end of the fluid-passage 4, that extends through the head or shoe 2, and which has fitted in its inner end the ordinary gasket 5, which projects beyond the plane of the inner coupling-face of the said head or shoe and is designed to form a fluid-tight connection with the corresponding or companion head or shoe coupled therewith or with the interchange coupling attachment 6 when the latter is used to couple the head or shoe 2 with an ordinary Westinghouse brake hose-coupling 7, fitted to one end of the ordinary brake hose-pipe 8.

It will be understood that in making up a train of cars some of the cars may be provided with the automatic air-brake coupling-heads, while others are provided with the usual brake hose-couplings, and ordinarily it would be impossible to properly couple or connect the automatic air-brake coupling-heads and the brake hose-couplings, but by means of the interchange coupling attachment 6 this coupling between the different couplings referred to may be readily effected, thereby facilitating the use of the air-brake system in connection with a train of cars equipped with the automatic air-brake couplings and with the Westinghouse or similar brake hose-couplings.

The interchange coupling attachment 6 essentially comprises a tubular body 9 of a greater length than the transverse width of the head or shoe 2, and the said tubular body 9 is preferably made sectional, and consists of the upper and lower sections 10 and 11, respectively, the upper of which sections 10 is provided with an interiorly-threaded lower end 12 to adjustably receive the exteriorlythreaded upper end or neck 13 of the lower section 11 of the coupling. By reason of adjustably connecting the separate sections of the coupling-body 9 together it will be readily understood that these two sections of the coupling-body may be relatively adjusted with respect to each other, in order that the attachment may be adjusted to suit variations in the widths of the coupling heads or shoes 2 or to suit other conditions which might exist and would otherwise interfere with the use of the attachment 6, providing the same was non-adjustable and made of a single casting.

The tubular coupling-body 9 is provided therein with a longitudinal fluid-passage 14, which opens at its opposite extremities into the fluid-orifices 15, formed in the flattened coupling-faces 16 on one side of both the upper and lower sections of the body 9. The flattened coupling-faces 16 are practically located at opposite ends of the body 9, in order to provide a connection between the fluid passage or orifice in the head or shoe 2 and the orifice in the brake hose-coupling 7 when it is desired to couple these two couplings together. The tubular body 9 is provided within the orifices 15, formed in the flattened faces 16, with the annular or circular retaining-grooves 17, which receive the securing-flanges 18, formed on the inner edges of the gaskets 19, which are fitted in and project beyond the said orifices 15 to provide for air-tight connections, respectively, with the gasket 5 of the head or shoe 2 and the usual gasket of the brake hose-coupling 7.

By reason of the location of the flattened coupling-faces 16 at opposite ends of the body 9 each of the sections 10 and 11 is provided with one of said coupling-faces, and immediately below the fluid-orifice in the upper section 10 of the coupling-body 9 the said upper section is provided with an offstanding hook-flange 20, that is adapted to engage over a flange or rib 21, formed at the lower side of the head or shoe 2. The upper section 10 of the coupling-body is further provided at the extreme upper end thereof, above the fluid-orifice therein, with a pair of parallel offstanding elongated rest-lugs 22, which are projected from the same side of the coupling-body as the hook-flange 20, and which are adapted to rest on the flange or rib 21ª, formed at the upper side of the head or shoe 2, and corresponding to the flange or rib 21 at the lower side of the head or shoe. The pair of parallel rest-lugs 22 are designed to accommodate therebetween a lever-latch 23. The lever-latch 23 is pivoted at one end, as at 24, between the lugs 22, and at an intermediate point between its ends the said latch is provided with an inturned catch-hook 24ª, which is adapted to be forced over the flange 21ª at the upper side of the head or shoe 2 to provide for firmly clamping the body 9 against the front or coupling side of the said head or shoe. When the body 9 is positioned as just described, with the hook-flange 20 engaged with the flanged lower side and the lever-latch engaged with the flanged upper side of the coupling head or shoe 2, the upper fluid-orifice in the body 9 will be alined with the fluid-passage 4 in the head or shoe 2, and the gaskets at this point will be held firmly in contact with each other to provide an air-tight connection between the coupling head or shoe 2 and the interchange coupling attachment.

When the tubular coupling-body 9 is clamped to the front or coupling side of the coupling head or shoe 2, the lower flattened coupling-face of the coupling-body formed on the lower section 11 projects below the coupling head or shoe 2 to provide means for conveniently connecting the brake hose-coupling 7 thereto. In order to provide for the connection of the ordinary brake hose-coupling 7 to the lower section of the coupling-body 9, the said lower section of the coupling-body is provided at one edge of its flattened coupling-face with an offstanding coupling-flange 25, which is adapted to register with the offset flange 26, arranged beyond the inner face of the brake hose-coupling 7, and the said flange 25 is provided at one side with a pin-notch 27, which receives the fastening-pin 28 of the brake hose-coupling 7.

At one edge of the flattened coupling-face of the lower body-section 11 the latter is further provided with a pair of offstanding pivot-lugs 29, between which is pivoted at one end, as at 30, the lever-latch 31. The lever-latch 31 is similar in construction to the lever-latch 23, and is provided at a point intermediate of its ends with an inturned catch-hook 32, that is adapted to be forced into engagement with the coupling-lip 34, projected from one end of the brake hose-coupling 7. In order to connect the brake hose-coupling 7 with the lower coupling-face of the body 9, it is simply necessary to force the said brake hose-coupling into registering fit with the flange 25, the notch 27, and the rest-lug 35, projected from the flattened lower coupling-face at one side of the fluid-orifice therein. When the brake hose-coupling has been thus positioned, the latch 31 is engaged with the lip 34, and provides for detachably clamping the brake hose-coupling 7 to the lower coupling-face of the body 9 in an air-tight fit, and thereby completing a coupling between the said brake hose-coupling and the head or shoe 2, so that an uninterrupted fluid-passage is provided between and through the said coupling head or shoe and said brake hose-coupling.

Of course when the coupling head or shoe 2 is to be used in connection with a companion head or shoe the attachment 6 is not employed, and in order that the latter may be supported conveniently for use at all times the tubular coupling-body 9 is provided on one side and near one end with a perforated lug 37, to which is connected one end of a supporting-chain 38, adapted to be suitably fastened to one end of the car, but it will of course be understood that the interchange coupling attachment can be conveniently carried in any manner at one end of a car, so as to be ready for use at all times.

While the interchange coupling attachment is illustrated and described as being provided with only one fluid-passage, it will of course be understood that in service upon passenger-cars the fluid-passage may be duplicated or triplicated, according to the number of pipe connections carried by the coupling head or shoe 2, it being observed that the coupling heads or shoes 2 for passenger-cars are usually provided with pipe connections for the air-brakes, the signal, and for steam heating.

When the coupling head or shoe 2 is not in use, the herein-described attachment forms a convenient and efficient dust shield or guard therefor. In using the attachment for this purpose the same is clamped to the head or shoe 2 in the manner described and the lower section 11 unscrewed from the upper section 10. A plug 37ª is then substituted for the lower section 11 and screwed into the interiorly-threaded lower end of the upper section 10, and provides for totally excluding dust and other flying foreign matter from the fluid passage or passages in the head or shoe 2.

Various changes in the form, proportion, and the minor details of construction may be resorted to without departing from the principal or sacrificing any of the advantages of this invention.

Having thus described the invention, what I claim as new, and desire to be secured by Letters Patent, is—

1. In an interchange coupling attachment for air-brake couplings, a tubular coupling-body provided with upper and lower flattened coupling-faces disposed at the same side of the body in nearly vertical alinement and having communicating orifices, said coupling-body being further provided at a point between the two orifices with an integral laterally-projecting hook-flange adapted to engage over the vertically-disposed flange or rib at the lower side of an automatic air-brake coupling head or shoe, and at its upper side above the upper coupling-face with a pair of elongated rest-lugs adapted to rest directly on top of the flange or rib at the upper side of said coupling head or shoe, a lever-latch pivoted at one end between said lugs and provided between its ends with an inturned catch-hook adapted to engage over the flange or rib on which said lugs rest, and fastening means for clamping an ordinary brake hose-coupling to the lower coupling-face, substantially as set forth.

2. In a coupling attachment of the class described, a tubular coupling-body provided with upper and lower flattened coupling-faces disposed at the same side of the coupling-body and having communicating orifices, said coupling-body being further provided at one side edge of the lower face with a notched flange, and with a rest-lug projected from the flattened lower coupling-face at one side of the orifice therein, a lever-latch pivotally connected at one end to the coupling-body opposite said notched flange and provided at an intermediate point with an inturned catch-hook adapted to engage with a lip on an ordinary brake hose-coupling, and means for coupling the upper coupling-face to an automatic air-brake coupling head or shoe, substantially as set forth.

In testimony that I claim the foregoing as my own I have hereto affixed my signature in the presence of two witnesses.

JAMES BRYANT THOMAS.

Witnesses:
T. J. HERBEL,
HENRY G. HERBEL.